Sept. 6, 1966         W. K. MEYER ET AL          3,270,811
MISCIBLE DISPLACEMENT PROCESS FOR PETROLEUM
RESERVOIRS CONTAINING BRINE AND OIL
Filed July 25, 1963
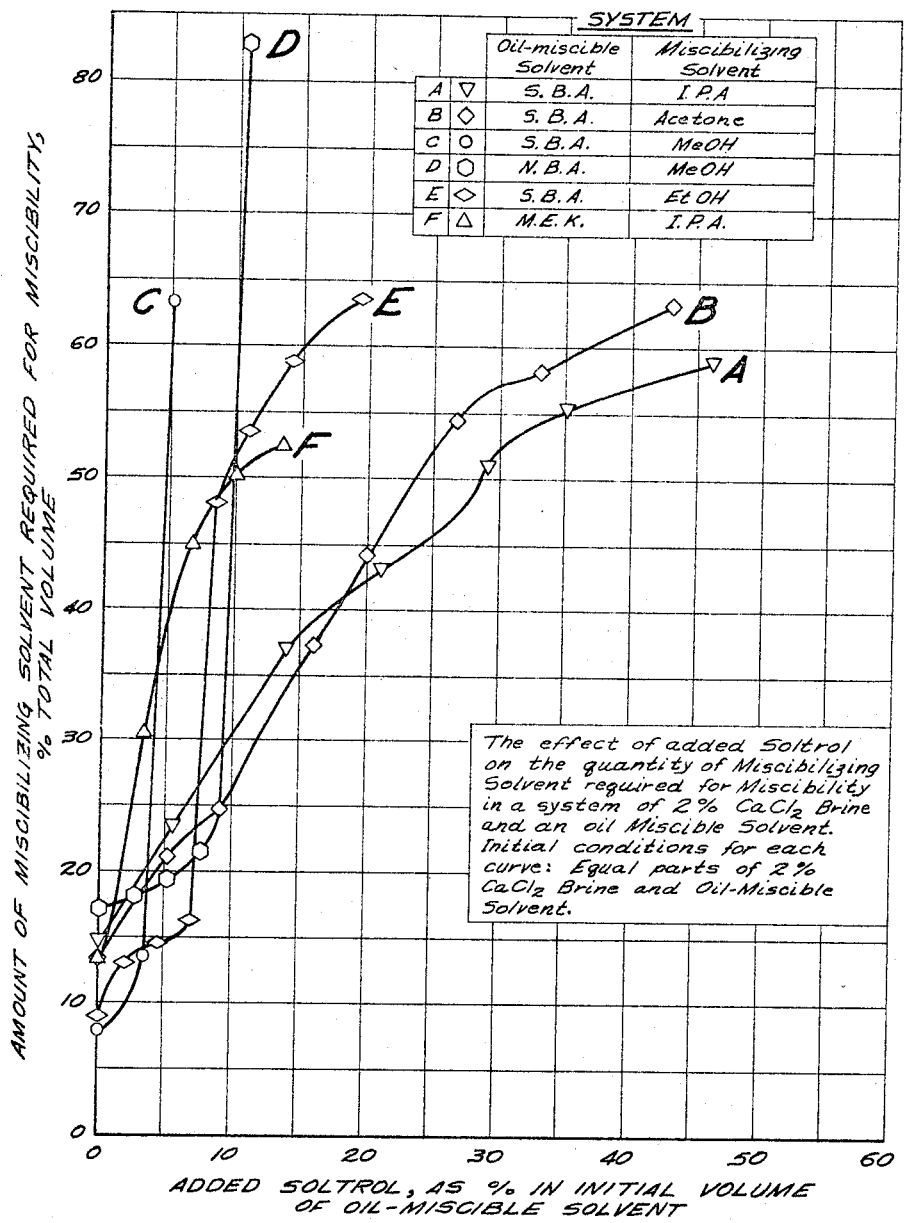
INVENTORS
W. KEITH MEYER &
JOSEPH J. TABER
BY
ATTORNEY United States Patent Office 3,270,811
Patented Sept. 6, 1966

3,270,811
MISCIBLE DISPLACEMENT PROCESS FOR PETROLEUM RESERVOIRS CONTAINING BRINE AND OIL
William K. Meyer, Pittsburgh, and Joseph J. Taber, Indiana Township, Allegheny County, Pa., assignors to Gulf Research & Development Company, Pittsburgh, Pa., a corporation of Delaware
Filed July 25, 1963, Ser. No. 297,500
6 Claims. (Cl. 166—9)

This invention relates to oil production from a petroleum reservoir by miscible displacement.

In the recovery of oil from an underground reservoir by miscible displacement, the oil is displaced by a fluid which is capable of mixing with the other fluids in the reservoir to form a single, homogeneous phase without the existence of an interface between the fluids. In one type of miscible displacement process, a predetermined volume of solvent is injected into the reservoir and displaced with water toward the producing wells. The solvent is referred to as an amphipathic solvent, and must be soluble both in water and in oil so that the reservoir oil is miscibly displaced by a solvent which is in turn miscibly displaced by the succeeding flood water. However, mixing of the solvent slug with reservoir fluids and the succeeding flood water results in the formation of transition zones of varying liquid composition ahead of and behind the slug. Because the amphipathic solvent is soluble in oil and in water the mixing of the reservoir fluids and the injected liquids creates an oil-solvent solution and a water-solvent solution that flow simultaneously in the reservoir. In some applications of the miscible slug process, these transition zones increase in length until they eventually consume the entire solvent slug, and the miscible displacement mechanism is replaced by inefficient two phase flow. In other applications of the process, the mixing of the injected liquids and the reservoir fluids causes the oil phase to become discontinuous as miscibility is achieved, and the miscible slug displaces only an aqueous solution through the reservoir with a consequent reduction in oil recovery.

The rate of consumption of a solvent slug is a function of the distance the slug travels through the reservoir and of the amounts of dilution by water and oil that the solvent can tolerate before it degenerates completely into two phases. The ability to withstand such dilution is indicated by the height of the binodal curve on a ternary phase diagram for the liquid system. For a single amphipathic solvent the ternary phase diagram is customarily drawn with 100 percent water at the lower left angle, 100 percent solvent at the vertex, and 100 percent oil at the lower right angle. To each of several liquid samples containing various proportions of oil and water, there is added the minimum volume of solvent required to achieve a single, miscible phase of the three liquids present. A point representing the concentrations of the three liquids in the miscible phase of each sample is plotted on the ternary diagram, and a smooth curve drawn through a number of such points is called the binodal curve.

The highest point on the binodal curve is called the binodal peak and serves as an index of the ability of the solvent to miscibilize the liquids at low concentrations of solvent. For the commonly used amphipathic solvents this peak is very high; for example, in a system composed of two percent calcium chloride brine and Soltrol (a light petroleum fraction having a viscosity of 1.35 cp. at 25° C. and a distillation range of 335° F. to 410° F.) the binodal peak for isopropyl alcohol is at a concentration of approximately 73 percent. For heavier crude oils the solvent requirement is even greater, and in a system of two percent calcium chloride brine and Drakeol 6 (a special blend of paraffinic hydrocarbons having a viscosity of 13.37 cp. at 25° C.) the binodal peak exceeds a solvent concentration of 95 percent isopropyl alcohol.

Many innovations in miscible slug processes have been proposed to reduce the requisite volume of the alcohol slug. One such method involves injecting a light hydrocarbon or mixture of hydrocarbons such as LPG, kerosene, or naphtha ahead of the solvent to reduce the viscosity of the oil that is contacted by the solvent slug. In a reservoir devoid of water, this would result in a miscible displacement of the oil; however, it does not cause complete miscible displacement by the solvent of the fluids from reservoirs containing water because the presence of reservoir water causes the formation of two phases in a liquid system containing solvent, water, and oil or other hydrocarbons. In such a process, miscibility is not achieved even with very large volumes of solvent.

The quantity of solvent required to miscibilize a liquid system containing oil and water depends on the average molecular weight of the oil and the molecular structure and weight of the solvent. For example, the monohydroxy, aliphatic alcohols having from one to four carbon atoms per molecule comprise a class of commonly used solvents which exemplify the effect of molecular weight and structure on the properties of the solvent. Methyl alcohol and ethyl alcohol are very soluble in water but exhibit a low solubility in oil. Normal and secondary butyl alcohols and those with longer carbon atom chains are very soluble in oil but less soluble in water. However, tertiary butyl alcohol differs from its isomers in that it is soluble in all proportions in both water and oil owing to its molecular structure. Similarly, the propyl alcohols are also soluble in all proportions in oil and water. Tertiary butyl alcohol and the propyl alcohols are suitable amphipathic solvents because of their solubility characteristics, and a preferred amphipathic solvent is isopropyl alcohol.

The volume of a single, amphipathic solvent required to miscibilize an oil-water system is less for oils of lower average molecular weight, but even in a system composed of equal volumes of distilled water and propane, the amount of isopropyl alcohol required for miscibility is approximately 55 percent of the total volume of the three-liquid mixture. A reservoir crude oil having an average molecular weight appreciably greater than that of propane, mixed with reservoir brine and chemically treated flood water, would require significantly more isopropyl alcohol to achieve miscibility. It is apparent, therefore, that no single, amphipathic solvent can miscibilize a system of reservoir fluids and injected flood water at concentrations of solvent less than 55 percent of the total volume.

It is an object of this invention to provide a combination of solvents to miscibilize oil and water at low solvent concentrations and thereby improve the relationship between slug volume and distance traveled in the reservoir prior to the loss of miscibility.

This invention resides in a process for miscible displacement with a sequence of two solvent slugs preceding a water drive. The first solvent is miscible with the reservoir oil and of limited miscibility with the connate water, and the second solvent is miscible with the first solvent and water at low concentrations of the second solvent. It is also required that the mixture of both solvents and water be capable of sustaining a reasonably high concentration of the reservoir oil without losing miscibility.

The figure is a chart showing the effect on the required volume of miscibilizing solvent in systems containing brine and an oil-miscible solvent as increasing amounts of oil are added to the system.

The required volume of solvent can be reduced significantly if the oil is displaced by an oil-miscible solvent which is of limited miscibility with the reservoir brine. Among the commonly known oil-miscible solvents are certain of the monohydroxy aliphatic alcohols having four or more carbon atoms per molecule. A preferred oil-miscible alcohol for the process of this invention is secondary butyl alcohol. The oil-miscible solvent is displaced through the reservoir by a miscibilizing solvent which is miscible with both the oil-miscible solvent and the succeeding flood water at low concentrations of miscibilizing solvent. Suitable compounds for use as miscibilizing solvents can be selected from the oxygenated hydrocarbon derivatives such as certain other monohydroxy aliphatic alcohols and ketones having from one to four carbon atoms per molecule. Preferred miscibilizing solvents for this process are isopropyl alcohol and acetone.

The most desirable combination of solvents is that which requires the least quantity of miscibilizing solvent to miscibilize both solvents and water. Such preferred combinations of solvents exhibit a low binodal peak on a ternary phase diagram constructed with 100 percent water at the lower left angle, 100 percent miscibilizing solvent at the vertex, and 100 percent oil-miscible solvent at the lower right angle. To determine the solvent combinations having low binodal peaks, several combinations were tested by adding a miscibilizing solvent to a number of different mixtures containing various proportions of water and an oil-miscible solvent until, in each mixture, a single miscible phase was formed. Two series of tests were conducted. In one series, the miscibilizing solvent used was isopropyl alcohol, and in the other series, it was tertiary butylalcohol.

Table I shows the corresponding binodal peaks for each of these two miscibilizing solvents when mixed with various oil-miscible solvents and water. The results indicate that, with respect to minimizing the required qanutity of miscibilizing solvent, the preferred oil-miscible alcohol is secondary butyl alcohol which, when mixed with water, exhibits a binodal peak of 6 percent with isopropyl alcohol and 13 percent with tertiary butyl alcohol. The lighter alcohols such as methanol and ethanol were not tested as oil-miscible solvents because their relatively low solubility in oil renders them unfit for this purpose.

The search for suitable oil-miscibile solvents other than the alcohols indicated that methyl ethyl ketone requires approximately the same volume of miscibilizing solvent as does secondary butyl alcohol. In a mixture of water and methyl ethyl ketone, the binodal peak for isopropyl alcohol is 8 percent, and for tertiary butyl alcohol the peak is 10 percent.

TABLE I.—BINODAL PEAKS FOR MIXTURES OF TWO SOLVENTS WITH WATER

| Oil-Miscibe Solvent | Binodal Peak (Percent Miscibilizing Solvent) | |
| --- | --- | --- |
|  | Isopropyl Alcohol | Tertiary Butyl Alcohol |
| Secondary Butyl Alcohol | 6 | 13 |
| Normal Butyl Alcohol | 23 | 37 |
| Isobutyl Alcohol | 25 | 39 |
| Normal Amyl Alcohol | 40 | 51 |
| Normal Hexyl Alcohol | 44 | 54 |
| Normal Octyl Alcohol | 47 | 57 |
| Methyl Ethyl Ketone | 8 | 10 |

Similar tests were made to determine the best miscibilizing solvent with secondary butyl alcohol as the oil-miscible solvent. Because the aliphatic alcohols having four or more carbon atoms in the chain generally are not very soluble in water, the investigation of the water-miscible alcohols was limited to methyl, ethyl, normal propyl, isopropyl, and tertiary butyl alcohol. Tertiary butyl alcohol was included because its structure renders it more water-soluble than its isomers. In addition to the alcohols, another commonly used amphipathic solvent, namely acetone, was tested. The results of these tests are shown in Table II.

TABLE II

| Miscibilizing solvent: | Binodal peak (Percent miscibilizing solvent) |
| --- | --- |
| Methyl alcohol | 5 |
| Ethyl alcohol | 5 |
| Normal propyl alcohol | 12 |
| Isopropyl alcohol | 6 |
| Tertiary butyl alcohol | 13 |
| Acetone | 4 |

The data of Table II indicate that, based on the criterion of a characteristically low binodal peak, the preferred miscibilizing solvents are methanol, ethanol, isopropanol, and acetone. However, there is an additional consideration applicable to a reservoir oil displacement process that further limits the choice of miscibilizing solvents and characterizes the preferred combinations of solvents for the process of this invention.

In the displacement of oil from an underground reservoir, unless the oil-miscible slug is exorbitantly large, mixing resulting from reservoir heterogeneities and incomplete oil displacement causes the miscibilizing solvent slug to contact a mixture of oil, brine, and oil-miscible solvent. The oil acts as a fourth constituent in the miscible system of water and solvents and, in sufficient quantity, causes the system to lose miscibility and form two phases. An investigation of the effects of such contamination of the miscible system produced the results shown in the figure. Tests were made to determine the amount of miscibilizing solvent required to sustain the miscibility of equal volumes of 2 percent calcium chloride brine and various oil-miscible solvents containing different amounts of Soltrol. The abcissa of the figure shows the quantity of Soltrol present as percent of the initial volume of oil-miscible solvent. The points of intersection of the various curves with the ordinate of the figure represent the concentrations of the particular miscibilizing solvents that are required to miscibilize a mixture of oil-miscible solvent and water which contains no oil. These points would correspond with the various values reported for the equivalent binodal peaks presented in Tables I and II if the test conditions were identical. However, the aqueous phase in the binodal peak tests for Tables I and II consisted of distilled water, and the aqueous phase for the contamination tests for the figure consisted of two percent calcium chloride brine. The binodal peak for the liquid system containing brine is somewhat higher than that for a system containing distilled water, as is shown by a comparison of the data from the figure and Tables I and II. Brine was used in the contamination tests to achieve a more accurate simulation of conditions existing in a petroleum reservoir.

The results of the oil contamination tests shown in the figure indicate that miscibility of the oil-miscible solvent, miscibilizing solvent, and water does not alone determine the suitability of a particular solvent combination for the process of this invention. The solvent combinations which are suitable for this process comprise those for which the required concentration of miscibilizing solvent is less than the required concentration of solvent in a single solvent system. As hereinbefore stated even the most favorable systems using a single solvent require at least 55 percent of miscibilizing solvent. The preferred solvent combinations for the process of this invention are those which require less than 55 percent miscibilizing solvent even at Soltrol concentrations equal to 25 percent of the initial volume of oil-miscible solvent. It is characteristic of such solvent combinations that at lower concentrations of Soltrol, the improvement over the single solvent system is even more significant. Representative of such solvent combinations are those indicated by curves A and B in the figure. For example, curve A represents a combination of secondary butyl alcohol and isopropyl alcohol for which the required volume of isopropyl alcohol is less than 55 percent up to a Soltrol concentration of 35 percent. Curve B represents the combination of secondary butyl alcohol and acetone, and the required volume of acetone does not equal 55 percent of the total liquid volume until the Soltrol concentration in the mixture equals 27 percent of the initial volume of secondary butyl alcohol. It is also evident from the figure, that when the miscible system is not contaminated by Soltrol, the required concentrations of isopropyl alcohol and acetone are 14.5 percent and 13 percent, respectively. From these results it is apparent that the displacement of oil by the combination of solvents consisting of secondary butyl alcohol followed by isopropyl alcohol, or of secondary butyl alcohol followed by acetone, gives a significant advantage over the volume of miscibilizing solvent required to displace the oil using a single amphipathic solvent.

The remaining solvent combinations indicated in the figure are not suitable to the process of this invention because, in a mixture containing those solvents and brine or water, the presence of small quantities of oil causes the required volume of miscibilizing solvent to increase substantially and to equal or exceed the solvent requirements for a system containing a single, amphipathic solvent. For example, the results of the binodal peak tests shown in Table II indicated that methyl alcohol and ethyl alcohol might be effective as miscibilizing solvents. However, it is shown by curve C of the figure that, in a mixture of brine, secondary butyl alcohol, and methyl alcohol, more than 60 percent of methyl alcohol is needed to sustain miscibility when the mixture is contaminated with a volume of Soltrol equal to 5 percent of the initial volume of secondary butyl alcohol. Similarly curve E shows that in a mixture of brine and secondary butyl alcohol approximately 59 percent ethyl alcohol is required to achieve miscibility with a Soltrol contamination of 15 percent. It was also known that a combination of normal butyl alcohol and methyl alcohol in distilled water exhibits a low binodal peak for methyl alcohol, but curve D shows that when the Soltrol concentration reaches 10.5 percent in a mixture with brine, normal butyl alcohol and methyl alcohol, the volume of methyl alcohol required for miscibility is 83 percent.

The data of Table I indicate that methyl ethyl ketone would be a preferable oil-miscible solvent. To determine the effectiveness of methyl ethyl ketone as an oil-miscible solvent, Soltrol was added to a mixture of brine, methyl ethyl ketone and isopropyl alcohol. Curve F indicates that at a Soltrol contamination of 13 percent, the amount of isopropyl alcohol required is equal to 52 percent of the total volume of the liquids present. Several additional solvent combinations were tested and found unsuitable for this process. Those discussed here are presented as representative of the performance of solvent combinations which do not reduce significantly the volume requirement for a miscibilizing solvent below that for a similar process employing a single amphipathic solvent.

The limit on the contamination of the miscible system with oil equal to 25 percent of the initial volume of oil-miscible solvent is significant because, in any application of the process of this invention, the actual oil contamination of the miscible zone will ordinarily not exceed 25 percent. Some contamination of the miscible zone is inevitable unless an exorbitantly large volume of the oil-miscible solvent is employed, and ordinarily a volume of oil-miscible solvent greater than 5 to 10 percent of the reservoir volume will not be used. As this slug of oil-miscible solvent is displaced through the reservoir, it occupies the pore volume originally occupied by the hydrocarbon fluids. Generally the oil-miscible solvent cannot achieve a displacement efficiency of 100 percent, and some oil will be left behind to contaminate the miscibilizing solvent. Because the leading edge of the miscibilizing solvent contacts a mixture of brine, oil-miscible solvent and oil, it is convenient to describe the degree of oil contamination as a percent of the volume of oil-miscible solvent contained in a cross-sectional element of the reservoir contacted by the advancing miscibilizing slug. Although the concentration of oil left behind the oil-miscible slug will vary in the reservoir from the injection to the producing wells, the volume of oil left by an oil-miscible solvent slug of 5 to 10 percent of the reservoir pore volume generally will be less than 25 percent of the volume of oil-miscible solvent contacted by the miscibilizing slug. Therefore, a combination of solvents which can sustain an oil contamination equal to 25 percent of the volume of the oil-miscible solvent without requiring a volume of miscibilizing solvent greater than 55 percent of the total volume of the oil-contaminated mixture of both solvents and water will effect a sufficient improvement in the volume of solvent required over the single solvent process to fall within the ambit of this invention. It is preferred also that the miscibilizing solvent be miscible with the oil-miscible solvent and water at a concentration of the miscibilizing solvent less than 20 percent.

The data of Tables I and II, and of the figure, indicate that the practical application of combined solvent miscible displacement processes requires a combination of solvents that are mutually miscible in water at low concentrations of the miscibilizing solvent and are also able to withstand substantial contamination by the reservoir oil without requiring large volumes of miscibilizing solvent to sustain miscibility. Because of the complexity of the interaction of the various solvents in combination, it is not possible to predict with reasonable certainty what solvent combinations will meet these requirements without performing tests similar to those set forth herein. However, if the requirements imposed by the process of this invention are satisfied, the resulting solvent combinations will provide a significant improvement over processes employing a single solvent for miscible displacement.

The preceding description defines our invention which resides in a method for recovery of oil by injecting a sequence of two solvent slugs ahead of a water flood. The solvents must be such that the first solvent is miscible with the reservoir oil and of limited miscibility with the reservoir brine, the second solvent is miscible with the first solvent and water at low concentrations of the second solvent, and a mixture of both solvents and water requires a concentration of the second solvent less than 55 percent for miscibility when the mixture contains a concentration of reservoir oil not greater than 25 percent of the volume of the first solvent.

Therefore we claim as our invention:

1. In a method for recovery of oil from a petroleum reservoir containing brine and oil by introducing into the reservoir through an injection well a sequence of solvents and displacing the solvents through the reservoir toward a producing well by injecting water into the reservoir, said solvents being such that a first injected solvent is miscible with the reservoir oil and substantially immiscible with the reservoir brine, and a second injected solvent is miscible with the first solvent and with water, the improvement of injecting as first and second solvents liquids which are mutually miscible in an aqueous mixture at a concentration of the second solvent less than 20 percent and which are mutually miscible in an aqueous mixture containing less than 55 percent of the second solvent in the total volume of liquids when the mixture contains a volume of the reservoir oil in a concentration of about 25 percent of the volume of the first injected solvent.

2. In a method for recovery of oil from a petroleum reservoir containing brine and oil by introducing into the reservoir through an injection well a sequence of solvents and displacing the solvents through the reservoir toward a producing well by injecting water into the reservoir, said solvents being such that a first injected solvent is miscible with the reservoir oil and substantially immiscible with the reservoir brine, and a second solvent is miscible with the first solvent and with water, the improvement of injecting as first and second solvents liquids which in an aqueous mixture have a binodal peak less than 20 percent of the second solvent and which in an aqueous mixture have a binodal peak less than 55 percent of the second solvent in the total volume of liquids when the mixture contains a volume of the reservoir oil in a concentration of about 25 percent of the volume of the first injected solvent.

3. A method for recovery of oil from a petroleum reservoir containing oil and brine comprising introducing into the reservoir through an injection well a sequence of solvent slugs and displacing the solvent slugs toward a producing well by injecting water into the reservoir, said sequence of solvent slugs comprising a first solvent slug that is miscible with the reservoir oil and substantially immiscible with the reservoir brine, a second solvent slug that is miscible with the first solvent and water at a concentration of the second solvent less than 20 percent, said solvents being such that, when a mixture of the first and second solvents and water is diluted with the reservoir oil to a concentration of oil of about 25 percent of the volume of the first solvent, the concentration of the second solvent required to sustain miscibility in the mixture is less than 55 percent of the total volume of liquids.

4. In a method for the recovery of oil from a petroleum reservoir containing brine and oil by introducing into the reservoir through an injection well a sequence of solvents and displacing the solvents through the reservoir toward a producing well by injecting water into the reservoir, said solvents being such that a first injected solvent is miscible with the reservoir oil and substantially immiscible with the reservoir brine, and a second injected solvent is miscible with the first solvent and with water, the improvement of injecting secondary butyl alcohol as the first solvent and injecting a second solvent chosen from the group consisting of isopropyl alcohol and acetone.

5. In a method for the recovery of oil from a petroleum reservoir containing brine and oil by introducing into the reservoir through an injection well a sequence of solvents and displacing the solvents through the reservoir toward a producing well by injecting water into the reservoir, said solvents being such that a first injected solvent is miscible with the reservoir oil and substantially immiscible with the reservoir brine, and a second injected solvent is miscible with the first solvent and with water, the improvement of injecting secondary butyl alcohol as the first solvent and isopropyl alcohol as the second solvent.

6. In a method for the recovery of oil from a petroleum reservoir containing brine and oil by introducing into the reservoir through an injection well a sequence of solvents and displacing the solvents through the reservoir toward a producing well by injecting water into the reservoir, said solvents being such that a first injected solvent is miscible with the reservoir oil and substantially immiscible with the reservoir brine, and a second injected solvent is miscible with the first solvent and with water, the improvement of injecting secondary butyl alcohol as the first solvent and acetone as the second solvent.

References Cited by the Examiner

UNITED STATES PATENTS

| | | | |
|---|---|---|---|
| 2,742,089 | 4/1956 | Morse et al. | 166—9 |
| 3,033,288 | 5/1962 | Holm | 166—9 |
| 3,096,821 | 7/1963 | Dyes | 166—9 |
| 3,163,213 | 12/1964 | Bernard | 166—9 |

OTHER REFERENCES

Slobod, "Research on Methods for Improving Oil Recovery from Pennsylvania Oil Fields," Producers Monthly, January 1960, TN 860.P7 (pp. 16–18, 20, 21 and 24 to 27).

CHARLES E. O'CONNELL, *Primary Examiner.*

S. J. NOVOSAD, *Assistant Examiner.*